(12) United States Patent
Leyh et al.

(10) Patent No.: US 10,555,382 B2
(45) Date of Patent: Feb. 4, 2020

(54) INDUCTION COOKING HOB INCLUDING A NUMBER OF INDUCTION COILS

(71) Applicant: Electrolux Appliances Aktiebolag, Stockholm (SE)

(72) Inventors: Björn Leyh, Rothenburg ob der Tauber (DE); Ulrich Häutle, Rothenburg ob der Tauber (DE); Jürgen Leikam, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 590 days.

(21) Appl. No.: 15/109,240

(22) PCT Filed: Mar. 10, 2015

(86) PCT No.: PCT/EP2015/054882
§ 371 (c)(1),
(2) Date: Jun. 30, 2016

(87) PCT Pub. No.: WO2015/144426
PCT Pub. Date: Oct. 1, 2015

(65) Prior Publication Data
US 2016/0330799 A1 Nov. 10, 2016

(30) Foreign Application Priority Data
Mar. 26, 2014 (EP) .................................. 14161679

(51) Int. Cl.
*H05B 6/12* (2006.01)
(52) U.S. Cl.
CPC ....... *H05B 6/1272* (2013.01); *H05B 2213/03* (2013.01)
(58) Field of Classification Search
CPC .............. H05B 6/1272; H05B 6/062; H05B 2206/022; H05B 2213/03; H05B 6/10;
(Continued)

(56) References Cited

U.S. PATENT DOCUMENTS 4,792,652 A * 12/1988 Seguy .................... H05B 6/065
219/624
4,876,436 A * 10/1989 Ide ........................ F24H 3/0411
392/360
(Continued)

FOREIGN PATENT DOCUMENTS

CN 102668693 9/2012
CN 102721089 10/2012
(Continued)

OTHER PUBLICATIONS

Lomp, Stephane, FR2965446A1, Inductor for induction boiling plate in e.g. consumer application, has conductor wound into turns, where each turn has straight segments, in its top view, defining respective axes . . . , Mar. 30, 2012, entire disclosure, Espacenet translation (Year: 2012).*

(Continued)

*Primary Examiner* — Tu B Hoang
*Assistant Examiner* — Masahiko Muranami
(74) *Attorney, Agent, or Firm* — Pearne & Gordon LLP (57) ABSTRACT

The present invention relates to an induction cooking hob (10) including a number of induction coils (12). Said induction coils (12) are arranged on the induction cooking hob (10) according to a predetermined scheme. At least a portion of the induction cooking hob (10) is covered by the induction coils (12). At least one heating area is formed on the induction cooking hob (10) by activating a single induction coil (12) or a combination of adjacent induction coils (12). At least a portion of the induction hob (12) includes induction coils (12) shaped as triangular discs.

14 Claims, 10 Drawing Sheets

(58) Field of Classification Search
CPC .... H05B 6/44; H05B 6/36; H01F 5/00; Y02B 40/126; C21D 1/10; C21D 9/28
USPC ....... 219/624, 620, 655, 656, 657, 661, 662, 219/670, 671, 675, 676, 391, 395, 398, 219/402, 408, 409, 410, 476, 477, 478, 219/480, 483, 486, 520, 525, 538, 539, 219/552; 392/309, 310, 432, 433
See application file for complete search history.

(56) References Cited

U.S. PATENT DOCUMENTS

| | | | | |
|---|---|---|---|---|
| 8,576,039 | B2* | 11/2013 | Yoon | H01L 23/5227 336/192 |
| 2001/0015352 | A1* | 8/2001 | Ohishi | H05B 6/04 219/662 |
| 2007/0023422 | A1* | 2/2007 | Obata | H05B 6/105 219/633 |
| 2010/0176116 | A1* | 7/2010 | Lee | H05B 6/1272 219/460.1 |
| 2010/0282737 | A1* | 11/2010 | Acero Acero | H05B 6/1254 219/600 |
| 2012/0248095 | A1* | 10/2012 | Lee | H05B 6/1263 219/620 |

FOREIGN PATENT DOCUMENTS

| | | | |
|---|---|---|---|
| EP | 2207401 A2 | 7/2010 | |
| EP | 2405714 A1 | 1/2012 | |
| EP | 2506675 A2 | 10/2012 | |
| FR | 2965446 A1 * | 3/2012 | ............... H05B 6/12 |
| FR | 2965446 A1 | 3/2012 | |
| JP | 2010080327 A * | 4/2010 | ............... H05B 6/10 |
| JP | 2011129254 A | 6/2011 | |

OTHER PUBLICATIONS

Uchida, Naoki, JP2010080327, Induction heating device, Apr. 8, 2010, entire disclosure, Espacenet translation (Year: 2010).*
International Search Report issued in PCT/EP2015/054882 dated Jun. 19, 2015, 3 pages.
English translation of Chinese Office action for Chinese application No. 201580007049.2 dated Nov. 5, 2018, 8 pages.

* cited by examiner

INDUCTION COOKING HOB INCLUDING A NUMBER OF INDUCTION COILS

The present invention relates to an induction cooking hob including a number of induction coils according to the preamble of claim 1.

Conventional induction cooking hobs include a number of induction coils arranged in a predetermined scheme. For example, the shapes of the induction coils are adapted to standardized cooking pots or pans. In this case, there are cold areas between the indication coils. In other examples, there are full surface induction systems without cold areas, wherein the cooking area is formed by a high number of small round induction coils. However, a very complex generator system is required in order to drive said high number of small round induction coils.

It is an object of the present invention to provide an induction cooking hob, which allows arrangements of cooking pots and pans having different shapes and sizes, wherein the base area of said cooking pots or pans is substantially superimposable with the area of the corresponding induction coil 12 or combination of adjacent induction coils 12, respectively.

The object of the present invention is achieved by the induction cooking hob according to claim 1.

According to the present invention at least a portion of the induction hob includes induction coils shaped as triangular discs.

The main idea of the present invention is the induction cooking hob with induction coils shaped as triangular discs. On or more heating areas may be formed on the induction cooking hob by activating a single induction coil or a combination of adjacent induction coils. The induction coils may be positioned on the induction cooking hob in a flexible way. In particular, the triangular induction coils are arranged close to each other, so that the cold areas on the induction hob are minimized. Cooking vessels of different shapes and sizes may be arranged on the induction cooking hob, wherein the base areas of said cooking vessels are superimposable or at least substantially superimposable with the area of one induction coil or of the combination of adjacent induction coils.

In particular, at least two of the induction coils shaped as triangular discs have the same size. If more or all induction coils have the same size, then the induction cooking hob may be produced by low costs. Further, induction cooking hobs with different arrangements of the same triangular induction coils may be provided.

For example, at least two of the induction coils are shaped as right-angled triangles. The right angles of the induction coils allow an adaption to a rectangular cooking hob as well as to a rectangular cooking vessel.

Preferably, the induction cooking hob includes at least one pair of neighboured induction coils shaped as right-angled triangles, wherein said pair forms a rectangular or square heating area. The triangular induction coils may be used for small-sized cooking vessels, while the rectangular or square heating area may be provided for medium-sized or large-sized cooking vessels.

Further, at least two induction coils shaped as right-angled triangles may be formed as equal-sided triangles. The induction coil shaped as equal-sided triangles allows that round or oval cooking vessel may be arranged thereon, wherein the common area of the cooking vessel and the triangle induction coil is maximal.

For example, a plurality of the rectangular or square heating areas is arranged in line on the induction cooking hob. This allows several rectangular heating areas with different sizes, so that different rectangular cooking pans match on said heating areas.

According to another example, a plurality of the rectangular or square heating areas is arranged as a matrix on the induction cooking hob. By the directed activation of certain induction coils heating areas of different shapes and sizes are formed.

Further, diagonals may be formed by two adjacent parallel hypotenuses of the pair of neighboured induction coils shaped as right-angled triangles, wherein said diagonals of directly neighboured rectangular or square heating areas are arranged perpendicular to each other. This allows the common use of neighboured induction coils belonging to different rectangular or square heating areas.

In particular, a further rectangular or square heating area is formed by four induction coils shaped as right-angled triangles, wherein the right angles of said four induction coils are arranged in a centre of the further rectangular or square heating area, and wherein the further rectangular or square heating area is arranged diagonally with respect to the induction cooking hob. The further rectangular or square heating area allows the arrangement of cooking vessels, which sizes are between the size of the rectangular or square heating area and the double size of said rectangular or square heating area.

According to another embodiment of the present invention, at least two of the induction coils are shaped as equilateral triangles and have the same size. The equilateral triangles are very symmetric and allow a plurality of constellations of the heating areas.

Preferably, six induction coils shaped as equilateral triangles form a heating zone shaped as a regular hexagon. This constellation allows six small-sized heating areas, three medium-sized heating areas and one large-sized heating area.

In particular, each induction coil is separately activatable and/or controllable. Additionally or alternatively, one or more predetermined combinations of adjacent induction coils are activatable and/or controllable.

Furthermore, the induction cooking hob may include two or more induction generators, wherein one induction generator is driving one induction coil or a pair of induction coils connected in series or in parallel.

For example, at least a part of the induction generators are synchronised generators.

Alternatively, at least one induction generator is provided for driving two or more induction coils in an alternating mode.

Novel and inventive features of the present invention are set forth in the appended claims.

The present invention will be described in further details with reference to the accompanied drawings, in which.

Figure 1:
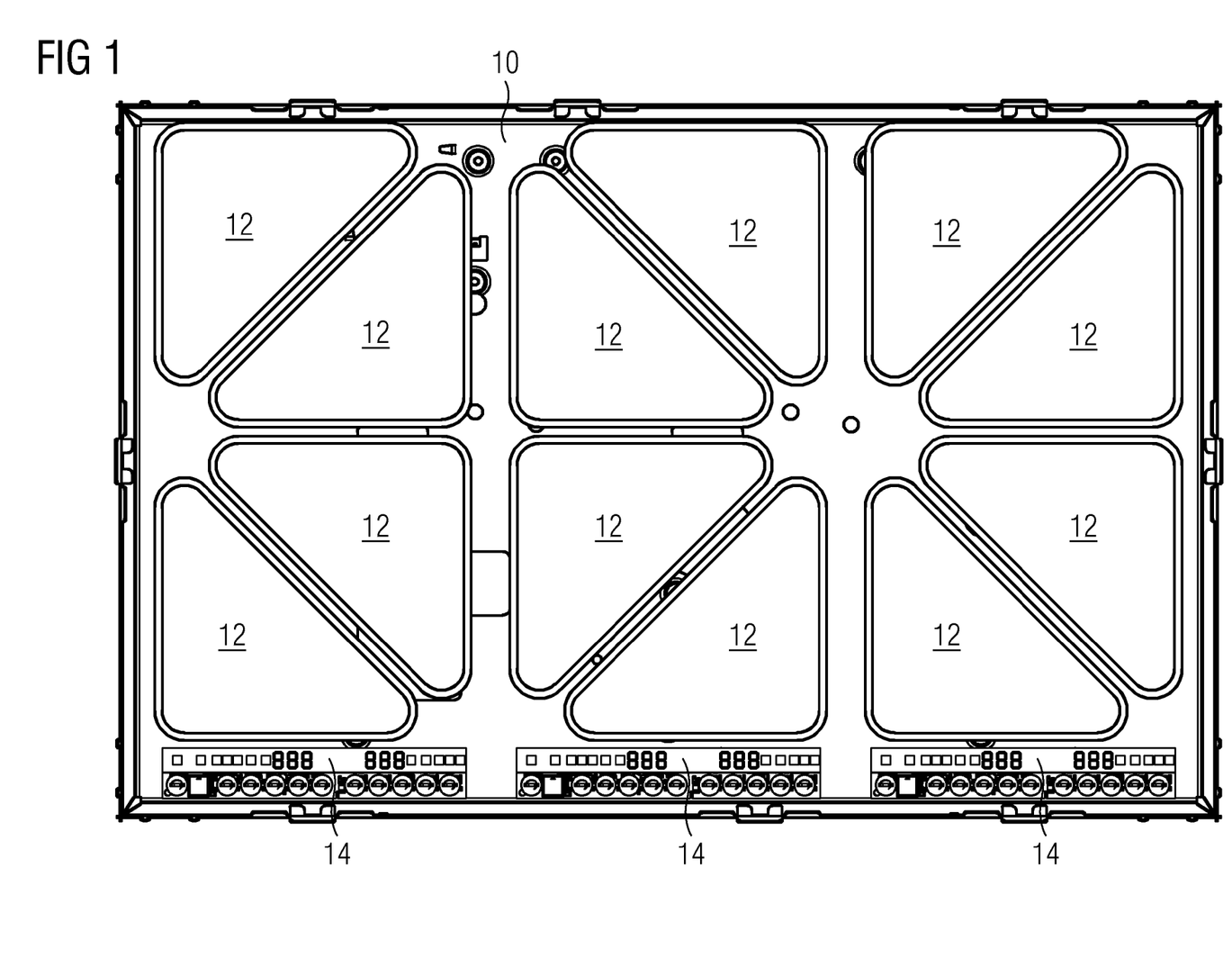
FIG. 1 illustrates a schematic top view of an induction cooking hob according to a first embodiment of the present invention.

FIG. 1 illustrates a schematic top view of an induction cooking hob 10 according to a first embodiment of the present invention. The induction cooking hob 10 includes a number of induction coils 12. In this example, the induction cooking hob 10 includes twelve induction coils 12. Further, the induction cooking hob 10 comprises three control and display devices 14.

Each induction coil 12 is formed as a horizontal triangular disc. In this embodiment, each induction coil 12 has the shape of a right-angled triangle. The corners of said triangular discs are rounded. In this example, the induction coils 12 are formed as equal-sided triangles or as substantially equal-sided triangles. The induction coils 12 are arranged in such a way that the complete surface of the induction cooking hob 10 is substantially covered by the induction coils 12 except the surface above the control and display devices 14. The content of cold areas between the induction coils 12 is minimized. In this example, each induction coil 12 has the same size.

The twelve induction coils 12 are arranged in such a way that a pair of neighboured induction coils 12 covers a rectangular or square area in each case. Thus, six pairs of induction coils 12 are arranged on the induction cooking hob 10. The hypotenuses of the two neighboured induction coils 12 are arranged side-by-side and in parallel to each other. The six pairs of induction coils 12 are arranged as a three-by-two matrix on the induction cooking hob 10. Three pairs of induction coils 12 form a front line. In a similar way, three pairs of induction coils 12 form a rear line. The parallel hypotenuses form a diagonal in each rectangular or square area. The diagonals of two directly neighboured pairs of induction coils 12 are always perpendicular to each other.

Preferably, each induction coil 12 is driven by one induction generator 26. Alternatively, two of the induction coils 12 may be connected in a serial or a parallel way, wherein the induction coils 12 may be switched by relays, triacs or IGBTs. In particular, the induction coils 12 are driven by synchronised induction generators 26 in order to avoid interference noise between the different induction coils 12. Another option is that the induction coils 12 are driven in an alternating way.

The three control and display devices 14 are arranged side-by-side in a front portion of the induction cooking hob 10. Each control and display device 14 corresponds with two pairs of induction coils 12 arranged behind said control and display device 14. The control and display device 14 allows a separate control of each induction coil 12. The complete surface of the induction cooking hob 10 behind the three control and display devices 14 does not contain any cold areas.

Figure 2:
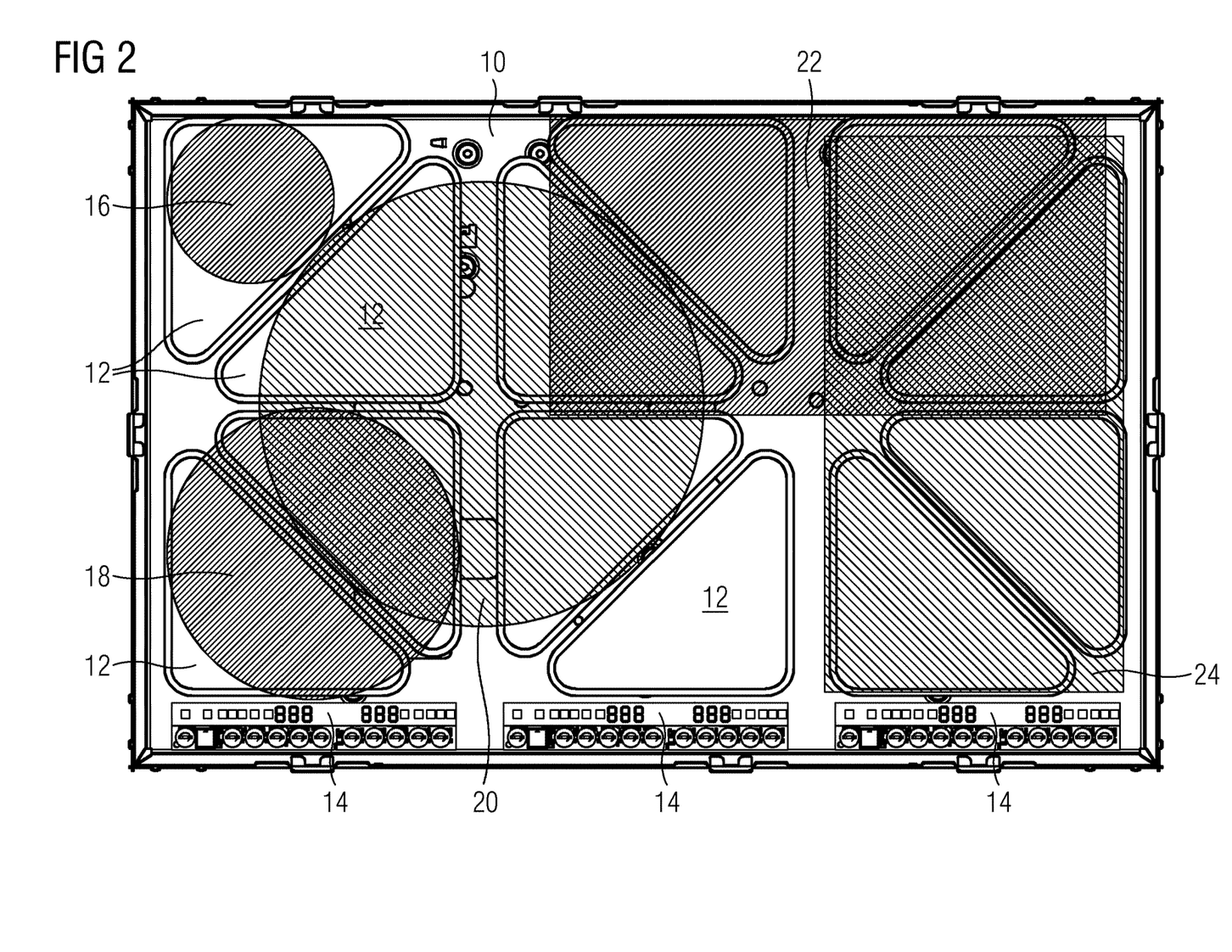
FIG. 2 illustrates a schematic top view of the induction cooking hob according to the first embodiment of the present invention.

FIG. 2 illustrates a schematic top view of the induction cooking hob 10 according to the first embodiment of the present invention. FIG. 2 shows the same induction cooking hob 10 as FIG. 1, wherein possible arrangements of cooking pots or pans are shown additionally.

A small-sized circular cooking vessel 16 is arranged upon one induction coil 12 in the rear left corner of the induction cooking hob 10. The area of the small-sized circular cooking vessel 16 extends within the area of the corresponding induction coil 12.

A medium-sized circular cooking vessel 18 may be arranged upon two induction coils 12 in the front left corner of the induction cooking hob 10. The area of the medium-sized circular cooking vessel 18 extends within the area of the two corresponding induction coils 12. The two induction coils 12 below the medium-sized circular cooking vessel 18 form a rectangular or square area.

A large-sized circular cooking vessel 20 may be arranged upon four induction coils 12 in a central portion on the left hand side of the induction cooking hob 10. The four induction coils 12 below the large-sized circular cooking vessel 20 form a rectangular or square area, wherein said rectangular or square area is arranged diagonally with respect to the surface of the induction cooking hob 10. The right angles of the four induction coils 12 below the large-sized circular cooking vessel 20 are arranged in a central portion of said rectangular or square area. The four induction coils 12 below the large-sized circular cooking vessel 20 belong to four different pairs of induction coils 12.

A first rectangular cooking vessel 22 may be arranged upon four induction coils 12 in the rear corner on the right hand side of the induction cooking hob 10. Said four induction coils 12 are two neighboured pairs of induction coils 12 in the rear line of the induction cooking hob 10. The area of the first rectangular cooking vessel 22 extends within the area of the four corresponding induction coils 12. The four induction coils 12 below the first rectangular cooking vessel 22 form a rectangular area.

A second rectangular cooking vessel 24 may be arranged upon four induction coils 12 on the right hand side of the induction cooking hob 10. Said four induction coils 12 are two neighboured pairs of induction coils 12. The area of the second rectangular cooking vessel 24 extends within the area of the four corresponding induction coils 12. The four induction coils 12 below the first rectangular cooking vessel 22 form a rectangular area.

FIG. 2 clarifies that the inventive arrangements of the induction coils 12 allow that cooking pots or pans having different shapes and sizes may be positioned on the induction cooking hob 10, so that the base area of the cooking pot or pan is substantially superimposable with the area of the corresponding induction coil 12 or induction coils 12.

Figure 3:
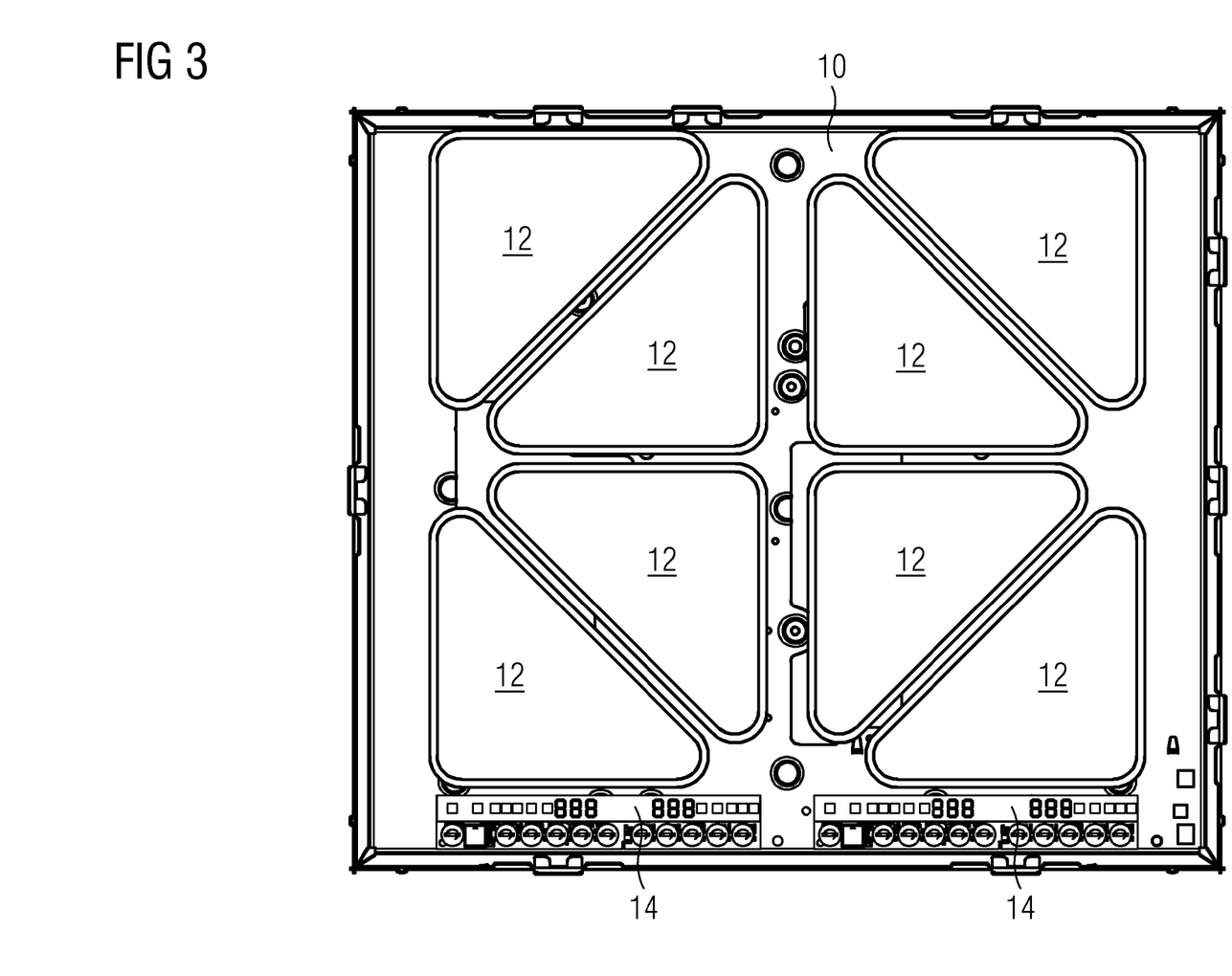
FIG. 3 illustrates a schematic top view of the induction cooking hob according to a second embodiment of the present invention.

FIG. 3 illustrates a schematic top view of the induction cooking hob 10 according to a second embodiment of the present invention. The induction cooking hob 10 of the second embodiment includes eight induction coils 12. Further, the induction cooking hob 10 comprises two control and display devices 14.

Each of the eight induction coils 12 is formed as a triangular disc and has the shape of a right-angled triangle. The corners of said triangular discs are rounded. Further, the induction coils 12 are formed as equal-sided triangles or as substantially equal-sided triangles. The induction coils 12 of the second embodiment are of the same type as the induction coils 12 of the first embodiment. The induction coils 12 are also arranged in such a way that the complete surface of the induction cooking hob 10, except the surface above the control and display devices 14, is substantially covered by the induction coils 12 and the content of cold areas between the induction coils 12 is minimized. Each of the induction coils 12 has the same size.

As mentioned above, two neighboured induction coils 12 are arranged in such a way that a pair of neighboured induction coils 12 covers a rectangular or square area. Thus, four pairs of induction coils 12 are arranged on the induction cooking hob 10. The hypotenuses of the two neighboured induction coils 12 are arranged side-by-side and in parallel to each other. The four pairs of induction coils 12 are arranged as a two-by-two matrix on the induction cooking hob 10. Two pairs of induction coils 12 form a front line, and two pairs of induction coils 12 form a rear line. The parallel hypotenuses form a diagonal in each rectangular or square area, wherein said diagonals of two directly neighboured pairs of induction coils 12 are always perpendicular to each other. Four inner induction coils 12 in the central portion of the induction cooking hob 10 form a rectangular or square area arranged diagonally with respect to the surface of the induction cooking hob 10. For example, said four inner induction coils 12 are suitable for the large-sized circular cooking vessel 20 shown in FIG. 2.

The two control and display devices 14 are arranged side-by-side in the front portion of the induction cooking hob 10, wherein each control and display device 14 corresponds with two pairs of induction coils 12 arranged behind said control and display device 14. The control and display device 14 allows a separate control of each induction coil 12. The complete surface of the induction cooking hob 10 behind both control and display devices 14 does not contain any cold areas.

Figure 4:
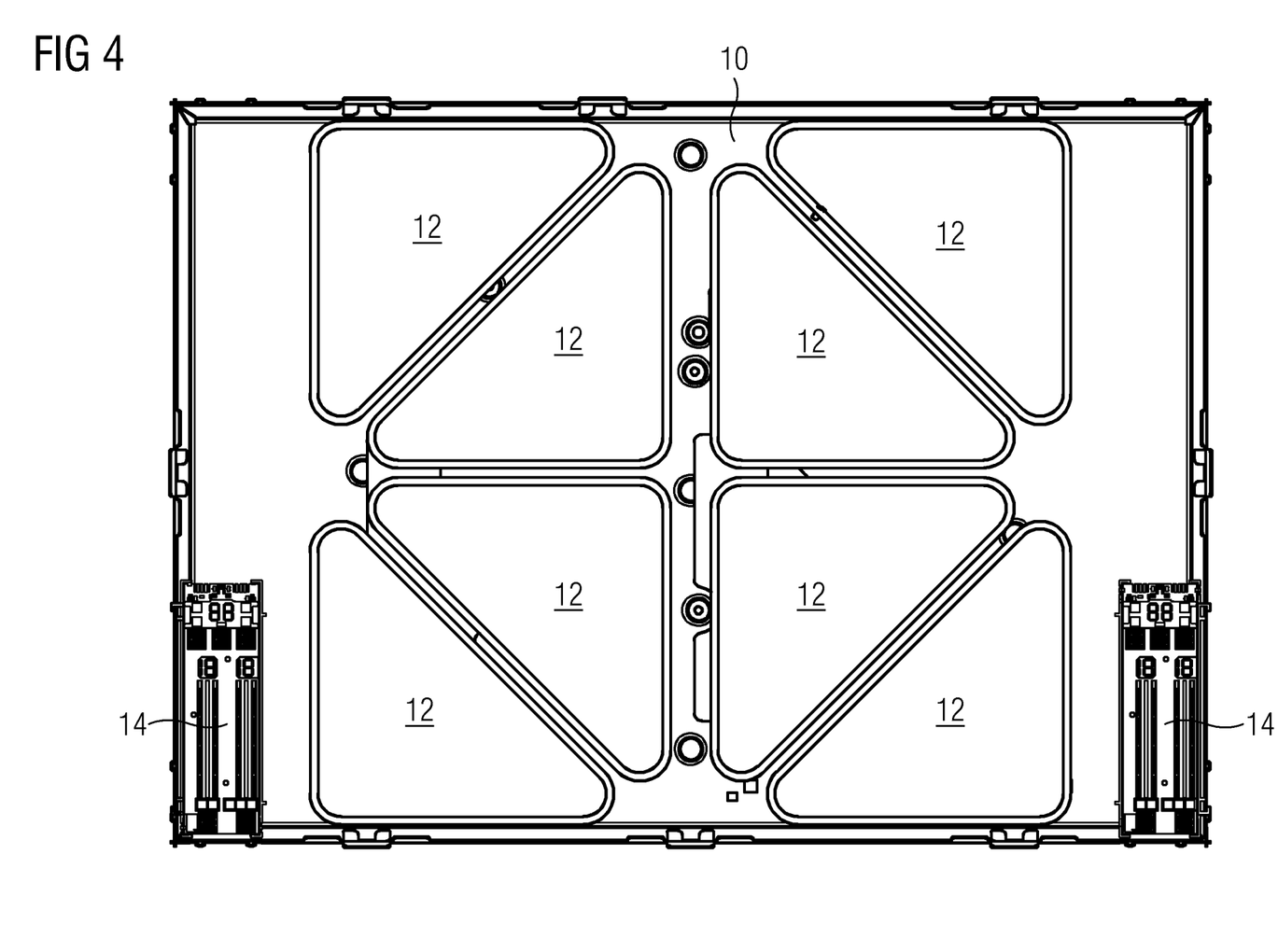
FIG. 4 illustrates a schematic top view of the induction cooking hob according to a third embodiment of the present invention.

FIG. 4 illustrates a schematic top view of the induction cooking hob 10 according to a third embodiment of the present invention. In the induction cooking hob 10 of the third embodiment the induction coils 12 are arranged in the same way as in the second embodiment. However, the two control and display devices 14 are arranged in the two front corners on the left hand side and right hand side, respectively, of the induction cooking hob 10. Cold areas occur only on the lateral portions of the surface of the induction cooking hob 10. The central portion between the front and rear sides of the induction cooking hob 10 does not contain any cold areas.

Figure 5:
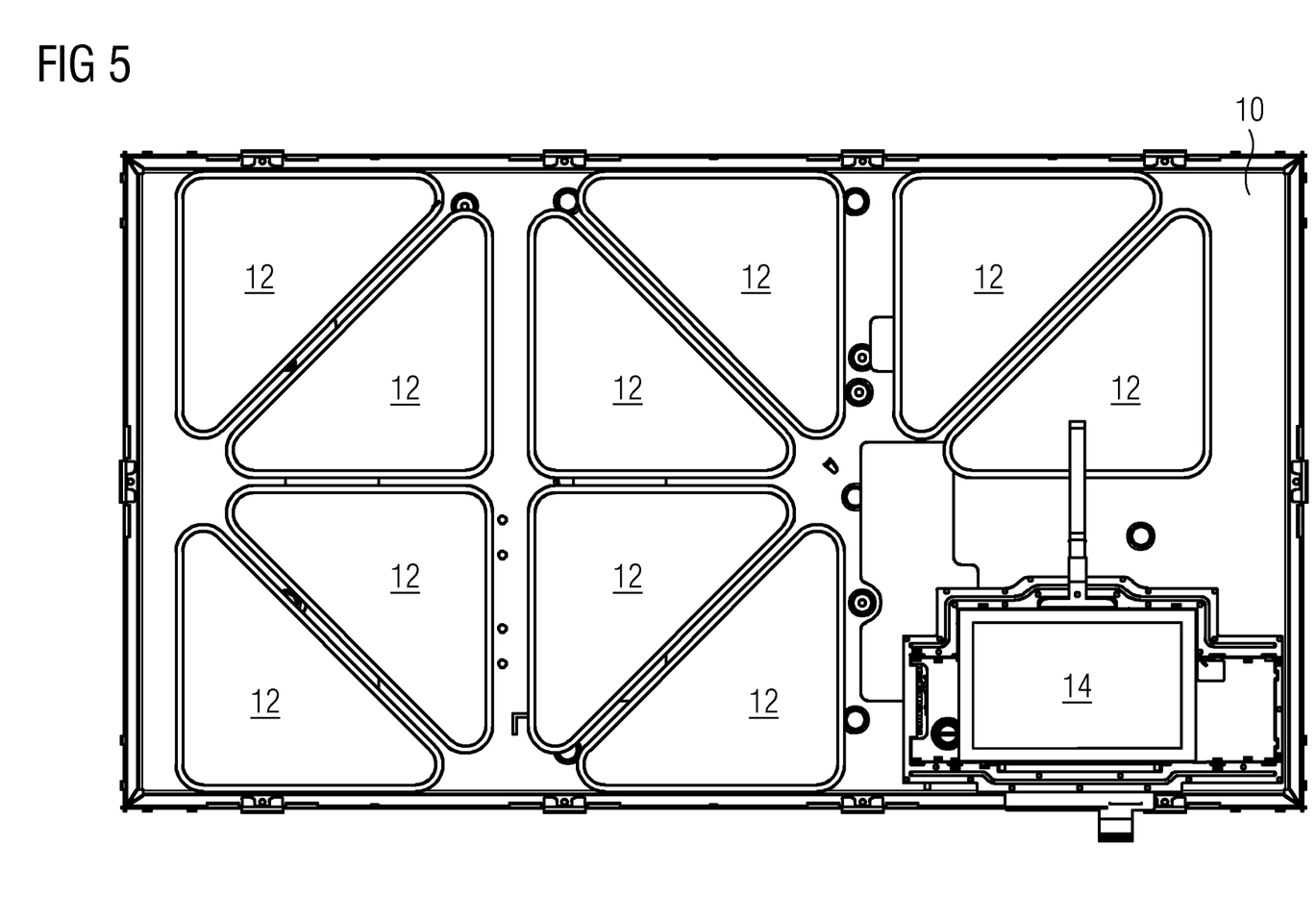
FIG. 5 illustrates a schematic top view of the induction cooking hob according to a fourth embodiment of the present invention.

FIG. 5 illustrates a schematic top view of the induction cooking hob 10 according to a fourth embodiment of the present invention. The induction cooking hob 10 of the fourth embodiment includes ten induction coils 12. Further, the induction cooking hob 10 comprises one control and display device 14.

The induction coils 12 of the fourth embodiment are arranged in a similar way as in the first embodiment. However, instead of the one pair of induction coils 12 in the front corner on the right hand side of the induction cooking hob 10 of the first embodiment, the induction cooking hob 10 of the fourth embodiment includes the control and display device 14 in this place. Cold areas occur only above and in the environment of the control and display device 14. The other portions of the surface of the induction cooking hob 10 do not contain any cold areas.

Figure 6:
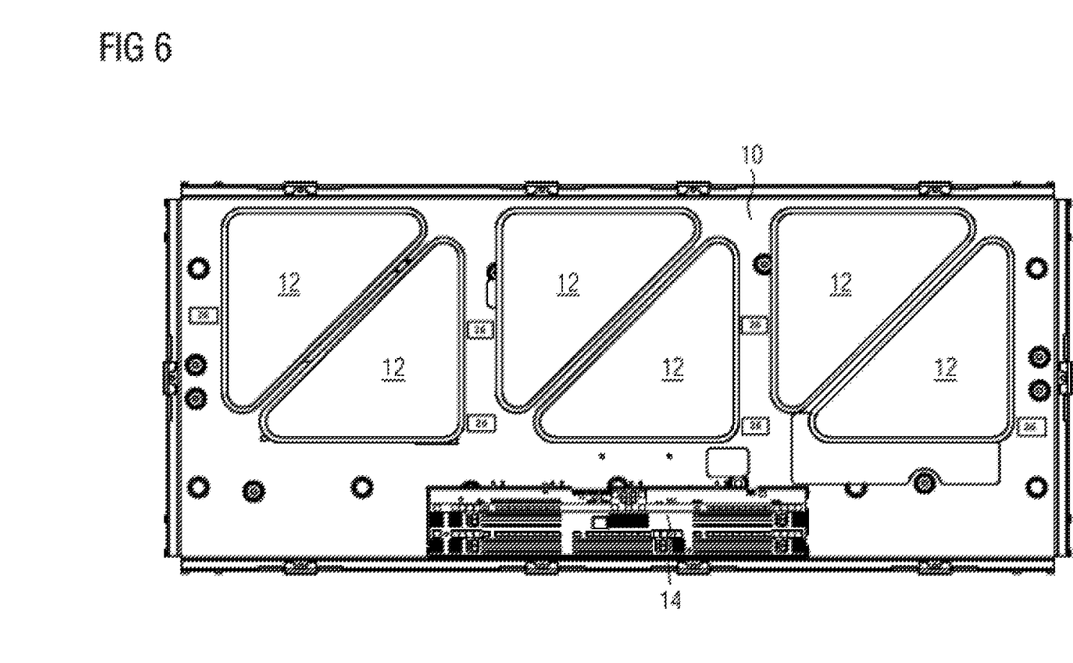
FIG. 6 illustrates a schematic top view of the induction cooking hob according to a fifth embodiment of the present invention.

FIG. 6 illustrates a schematic top view of the induction cooking hob 10 according to a fifth embodiment of the present invention. The induction cooking hob 10 of the fifth embodiment includes six induction coils 12. Further, the induction cooking hob 10 comprises one control and display device 14.

Two neighboured induction coils 12 are arranged in such a way that a pair of neighboured induction coils 12 covers a rectangular or square area. Thus, three pairs of induction coils 12 are arranged on the induction cooking hob 10. Said three pairs of induction coils 12 are arranged side-by-side and form a line. The hypotenuses of the induction coils 12 of one pair are arranged side-by-side and in parallel to each other. The parallel hypotenuses form a diagonal in each rectangular or square area. Moreover, the diagonals of the three pairs of induction coils 12 are parallel to each other. Cold areas occur only in the small front portion of the induction cooking hob 10. The larger rear portion of the surface of the induction cooking hob 10 does not contain any cold areas.

The small-sized circular cooking vessel 16, the medium-sized circular cooking vessel 18 and the rectangular cooking vessels 22 or 24 may be arranged on the induction cooking hob 10 of the fifth embodiment, so that the base areas of said cooking vessels are substantially superimposable with the areas of the corresponding induction coil 12 or induction coils 12.

Figure 7:
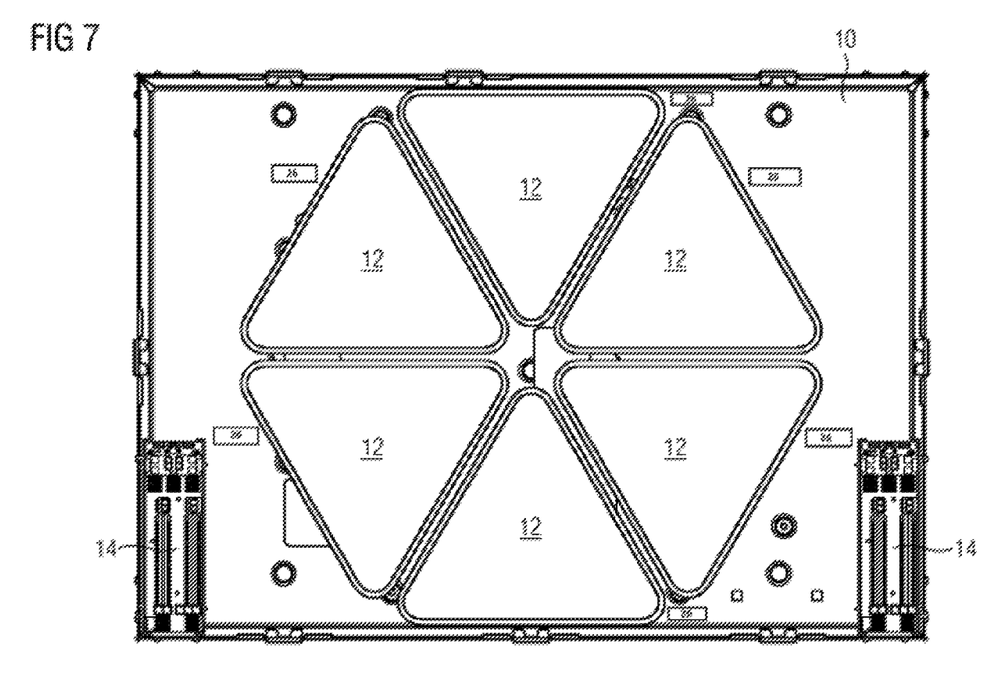
FIG. 7 illustrates a schematic top view of the induction cooking hob according to a sixth embodiment of the present invention.

FIG. 7 illustrates a schematic top view of the induction cooking hob 10 according to a sixth embodiment of the present invention. The cooking hob 10 according to the sixth embodiment includes six induction coils 12 formed as triangular discs. Unlike in the former embodiments, said six induction coils 12 are formed as equilateral triangles. The corners of the triangular discs are also rounded. The six induction coils 12 have the same size and form a heating area. Said heating area is formed as a regular hexagon. Further, the induction cooking hob 10 comprises two control and display devices 14 arranged in the both front corners of said induction cooking hob 10.

The regular hexagon is equally subdivided into the six equilateral triangles. This constellation allows the positioning of cooking pots and pans of different shapes and sizes. For example, the small-sized circular cooking vessel 16 shown in FIG. 2 may be arranged on one of the six induction coils 12. In this case, six of said small-sized circular cooking vessels 16 are arrangeable on the induction cooking hob 10 at the same time. The medium-sized circular cooking vessel 18 shown in FIG. 2 may be arranged on two neighboured induction coils 12. Thus, three of said medium-sized circular cooking vessels 18 are arrangeable on the induction cooking hob 10 at the same time. In a similar way, a medium-sized rectangular cooking vessel may be arranged on two neighboured induction coils 12. The large-sized circular cooking vessel 20 shown in FIG. 2 may be arranged in the centre of the regular hexagon.

The present invention allows that cooking vessels of different shapes and sizes may be arranged on the induction cooking hob 10, so that the base areas of said cooking vessels are superimposable or at least substantially superimposable with the areas of the corresponding induction coil 12 or induction coils 12, respectively.

The right positioning of the triangular induction coils 12 allows a proper coverage of the surface of the induction cooking hob 10. Substantially the complete surface of the induction cooking hob 10 may be covered by said induction coils 12 except the required area or areas for the control and display device 14. Larger cold areas between the induction coils 12 are avoided. The inventive induction cooking hob 10 can be promoted as a full surface induction cooking hob.

The induction cooking hob 10 according to the present invention requires a relative low number of induction coils 12 and therefore a low number of induction generators 26. The surface of the induction cooking hob 10 is offering an equal heat distribution.

The induction cooking hobs 10 according to the first to fifth embodiments of the present invention includes only one type of induction coil 12, i.e. formed as right-angled triangle and as equal-sided triangle or substantially equal-sided triangle. However, the induction coils 12 of the first and second embodiments are smaller than those of the third, fourth and fifth embodiments, since the control and display devices 14 in the first and second embodiments are arranged in the front portions of the induction cooking hobs 10. Said one type of induction coil 12 is suitable for a plurality of different constellations of the induction cooking hob 10 and may be used as a standard type. The first to fifth embodiments of the present invention are examples of the possible geometric arrangements of said induction coils 12. Other arrangements are also possible. The standard type of induction coils 12 allows a production of the induction cooking hob 10 by low costs.

In a similar way, the induction cooking hob 10 according to the sixth embodiment of the present invention includes only one type of induction coil 12, i.e. formed as equilateral triangle, which also allows the production of the induction cooking hob 10 by low costs.

Figure 8:
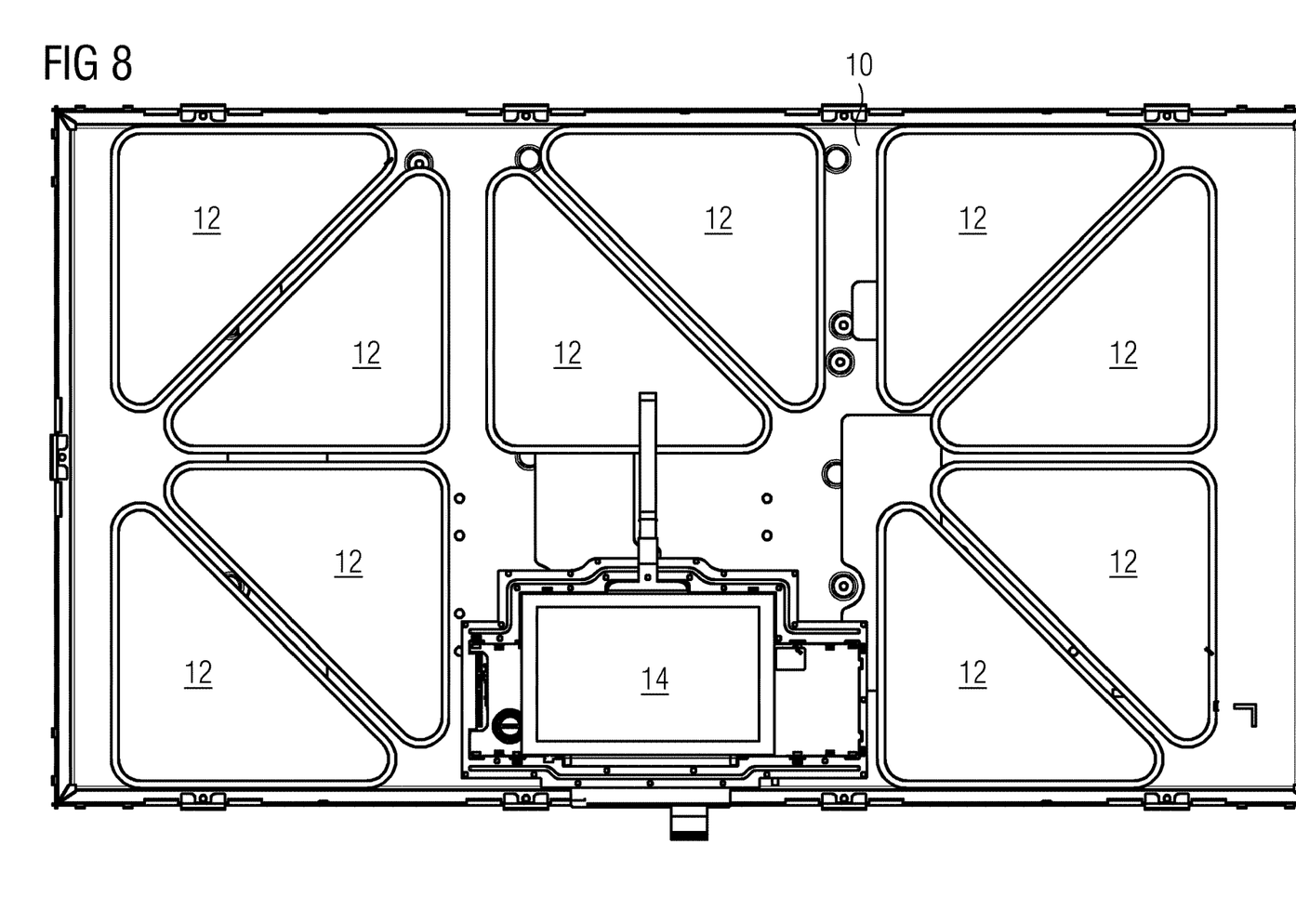
FIG. 8 illustrates a schematic top view of the induction cooking hob according to a seventh embodiment of the present invention.

FIG. 8 illustrates a schematic top view of the induction cooking hob 10 according to a seventh embodiment of the present invention. The induction cooking hob 10 of the seventh embodiment is similar to the induction cooking hob 10 of the fourth embodiment, wherein the positions of the control and display device 14 and the two induction coils 12 in the central front portion of the induction cooking hob 10 are interchanged.

The control and display device 14 is arranged in the central front portion of the induction cooking hob 10. The ten induction coils 12 are arranged in the rear portion and in the lateral portions on the left hand and right hand sides of the induction cooking hob 10. The ten induction coils 12 enclose the rear side and the left hand and right hand sides of the control and display device 14.

Figure 9:
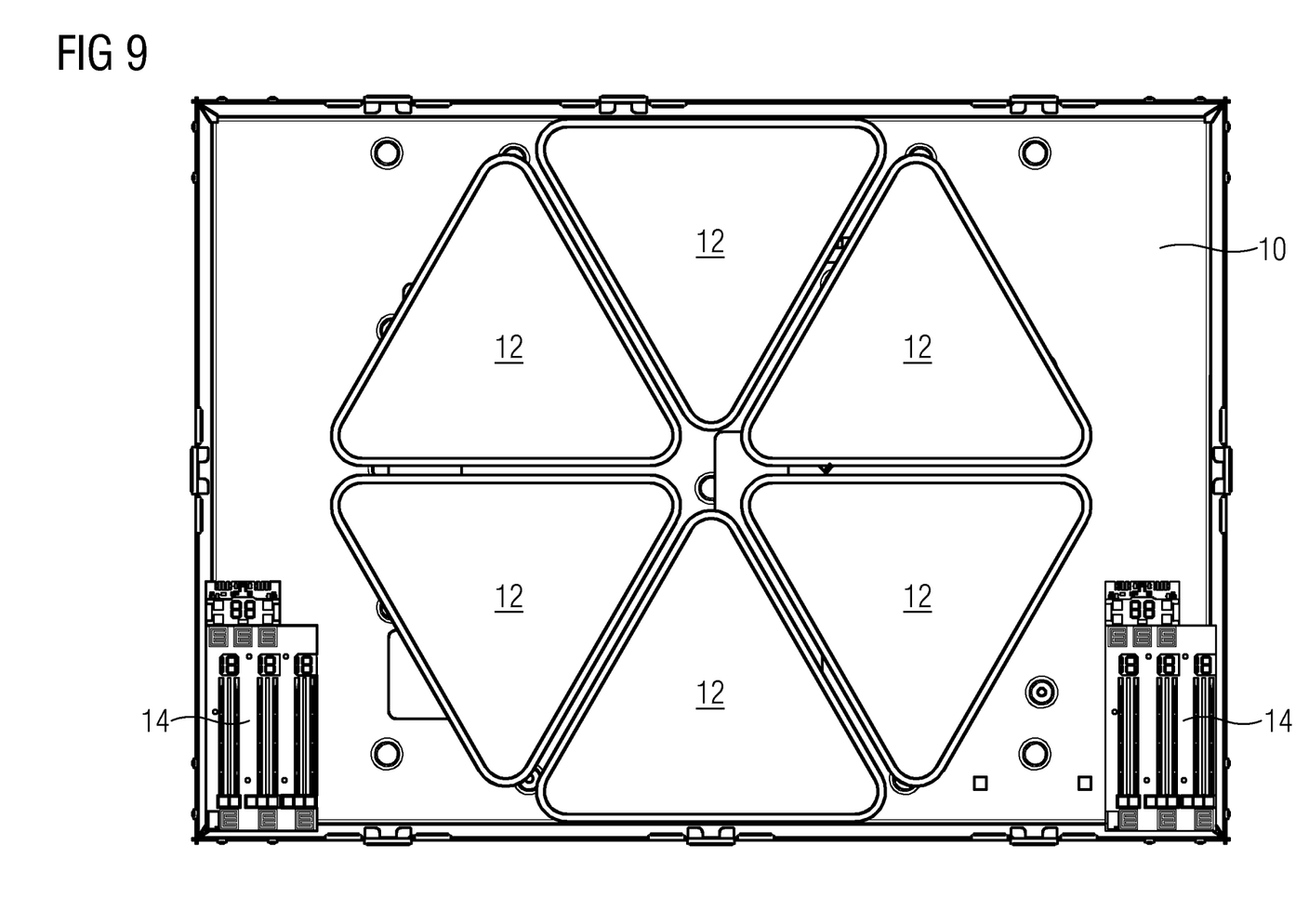
FIG. 9 illustrates a schematic top view of the induction cooking hob according to an eighth embodiment of the present invention.

FIG. 9 illustrates a schematic top view of the induction cooking 10 hob according to an eighth embodiment of the present invention. The induction cooking hob 10 of the eighth embodiment is similar to the induction cooking hob 10 of the sixth embodiment, wherein the control and display devices 14 arranged in both front corners of the induction cooking hob 10 includes three sub-units in each case. Each sub-unit corresponds with one of the induction coils 12. Thus, each induction coil 12 is separately controllable. In contrast, the induction cooking hob 10 of the sixth embodiment includes two control and display devices 14 with two sub-units in each case, so that four induction coils 12 or groups of induction coils 12, respectively, are separately controllable.

Figure 10:
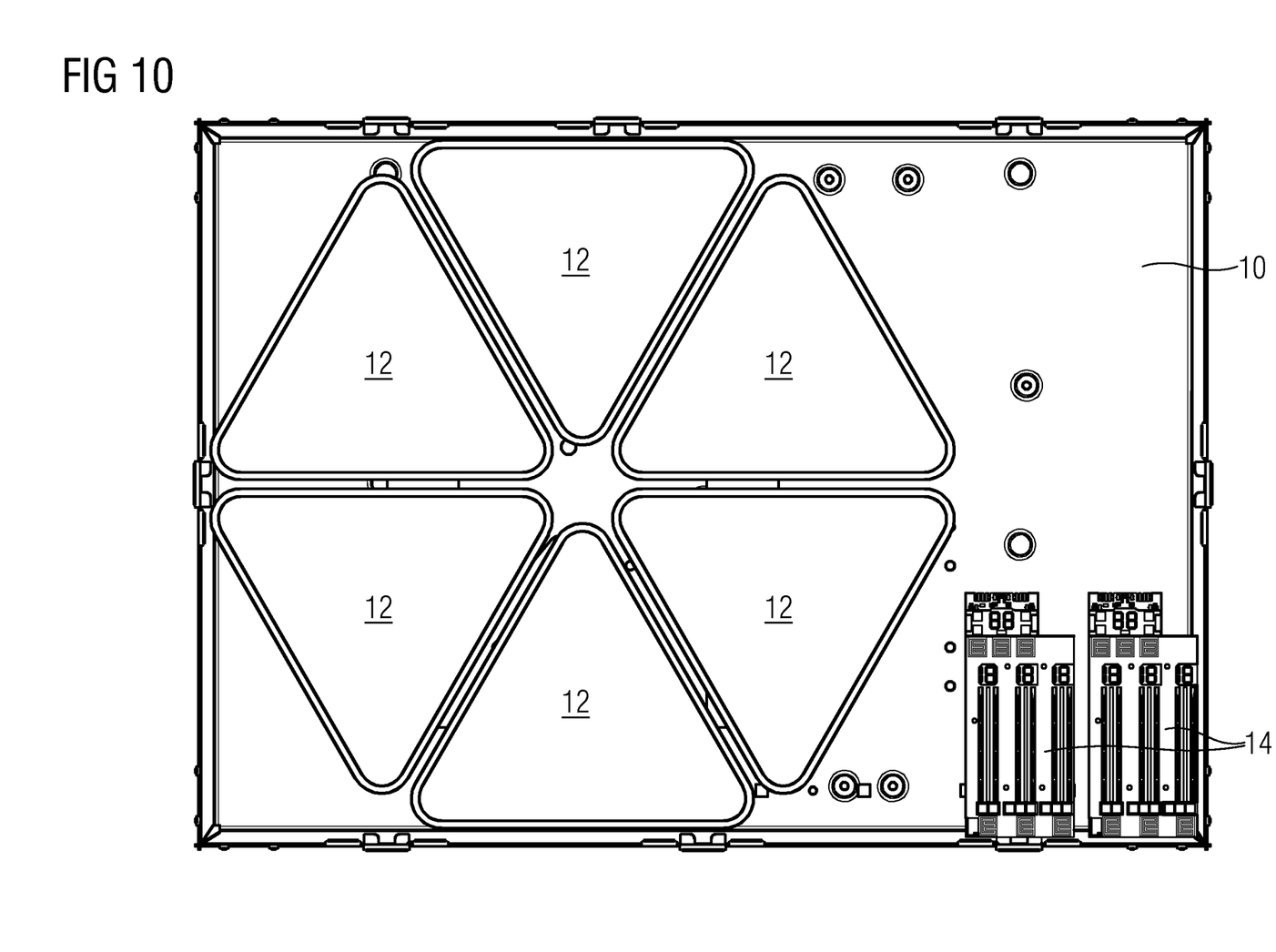
FIG. 10 illustrates a schematic top view of the induction cooking hob according to a ninth embodiment of the present invention.

FIG. 10 illustrates a schematic top view of the induction cooking hob 10 according to a ninth embodiment of the present invention. The induction cooking hob 10 of the ninth embodiment is similar to the induction cooking hob 10 of the eighth embodiment, wherein both control and display devices 14 are arranged in the front corner on the right hand side of the induction cooking hob 10. Each control and display device 14 includes three sub-units. The induction coils 12 are arranged in the central portion and on the left hand side of the induction cooking hob 10.

Moreover, the induction cooking hob 10 according to the present invention may be subdivided into portions, in which the induction coils 12 are arranged according to different schemes. For example, in the one portion the induction coils 12 are arranged according to one of the embodiments mentioned above, while in the other portion the induction coils 12 are arranged according to another embodiment. Further, in one or more portions the induction coils 12 are arranged according to the embodiments of the present invention, while in the other portion or portions the induction coils 12 are arranged according to a conventional scheme.

In the above embodiments the induction coils 12 are arranged in a symmetric way. This arrangement allows the use with large pots and pans covering two or more adjacent induction coils 12. The control of said adjacent induction coils 12 may be combined by a bridge function in horizontal or in a vertical way. The commonly controlled adjacent induction coils 12 provide the same heat distribution above their surfaces.

Although illustrative embodiments of the present invention have been described herein with reference to the accompanying drawing, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 induction cooking hob
12 induction coil
14 control and display device
16 small-sized circular cooking vessel
18 medium-sized circular cooking vessel
20 large-sized circular cooking vessel
22 first rectangular cooking vessel
24 second rectangular cooking vessel

The invention claimed is:

1. An induction cooking hob including a number of induction coils and a control and display device, wherein:
    said induction coils are arranged on the induction cooking hob according to a predetermined scheme,
    at least a portion of the induction cooking hob is covered by the induction coils, and
    at least one heating area adapted to support a cooking vessel is formed on the induction cooking hob by activating a single induction coil or a combination of adjacent induction coils, wherein at least a portion of the induction cooking hob includes triangular discs forming triangular induction coils shaped as right-angled triangles, wherein adjacent ones of triangular induction coils together form a rectangular or a square heating area, wherein a first pair of adjacent triangular induction coils has a first pair of parallel hypotenuses adjacent to one another, and a second pair of adjacent triangular induction coils has a second pair of parallel hypotenuses adjacent to one another, the first pair of hypotenuses and wherein said control and display device controls at least one of said first or second pairs of adjacent triangular induction coils being perpendicular to the second pair of hypotenuses.

2. The induction cooking hob according to claim 1, wherein at least two of the triangular induction coils have the same size.

3. The induction cooking hob according to claim 1, wherein at least two of said triangular induction coils shaped as right-angled triangles have sides such that the sides of a first of said two triangular induction coils are equal in length to the sides of a second of said two triangular induction coils.

4. The induction cooking hob according to claim 1, comprising a plurality of said rectangular or square heating areas arranged as a matrix on the induction cooking hob.

5. The induction cooking hob according to claim 1, comprising further a second larger rectangular or square heating area formed by four triangular induction coils shaped as right-angled triangles, wherein right angles of said four triangular induction coils are arranged in a centre of the further rectangular or square heating area, and wherein the four triangular induction coils forming said second larger rectangular or square heating area are each one of a pair of adjacent triangular induction coils of four separate rectangular or square heating areas.

6. The induction triangular cooking hob according to claim 1, wherein each said induction coil is separately controlled.

7. The induction cooking hob according to claim 1, comprising two or more induction generators, wherein one induction generator drives one said triangular induction coil or drives one of the said pairs of triangular induction coils connected in series or in parallel.

8. The induction cooking hob according to claim 7, wherein at least a part of the induction generators are synchronised generators.

9. The induction cooking hob according to claim 7, wherein at least one said induction generator is provided for driving two or more of said triangular induction coils in an alternating mode.

10. An induction cooking hob including a number of induction coils and a control and display device, wherein:
said induction coils are arranged on the induction cooking hob according to a predetermined scheme,
at least a portion of the induction cooking hob is covered by the induction coils, and
at least one heating area adapted to support a cooking vessel is formed on the induction cooking hob by activating a single induction coil or a combination of adjacent induction coils, at least a portion of the induction cooking hob including triangular discs forming triangular induction coils, wherein at least six of the triangular induction coils are shaped as equilateral triangles having the same size and form a heating zone shaped as a regular hexagon, wherein respective sides of said triangular induction coils form a perimeter of the regular hexagon.

11. The induction cooking hob according to claim 10, comprising two or more induction generators, wherein one induction generator drives one said triangular induction coils or said at least six triangular induction coils connected in series or in parallel.

12. The induction cooking hob according to claim 11, wherein at least a part of the induction generators are synchronised generators.

13. The induction cooking hob according to claim 11, wherein at least one said induction generator is provided for driving two or more of said triangular induction coils in an alternating mode.

14. The triangular induction cooking hob according to claim 10, wherein each said induction coil is separately controlled.

* * * * *

UNITED STATES PATENT AND TRADEMARK OFFICE
CERTIFICATE OF CORRECTION

PATENT NO. : 10,555,382 B2  
APPLICATION NO. : 15/109240  
DATED : February 4, 2020  
INVENTOR(S) : Leyh et al.

Page 1 of 1

It is certified that error appears in the above-identified patent and that said Letters Patent is hereby corrected as shown below:

In the Claims

In Claim 6  
Column 9, Line 20: should read: The induction cooking hob according to claim 1, wherein each said triangular induction coil is separately controlled.

In Claim 14  
Column 10, Line 31: should read: The induction cooking hob according to claim 10, wherein each said triangular induction coil is separately controlled.

Signed and Sealed this  
Twelfth Day of May, 2020

Andrei Iancu  
*Director of the United States Patent and Trademark Office*